US008730247B2

United States Patent
Hiroi et al.

(10) Patent No.: US 8,730,247 B2
(45) Date of Patent: May 20, 2014

(54) MULTI-GRAPHICS PROCESSOR SYSTEM, GRAPHICS PROCESSOR AND RENDERING METHOD

(75) Inventors: Toshiyuki Hiroi, Saitama (JP); Masaaki Oka, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 1602 days.

(21) Appl. No.: 11/484,354

(22) Filed: Jul. 10, 2006

(65) Prior Publication Data

US 2007/0013702 A1    Jan. 18, 2007

(30) Foreign Application Priority Data

Jul. 12, 2005 (JP) ................................. 2005-202659
May 11, 2006 (JP) ................................. 2006-132886

(51) Int. Cl.
*G06F 15/16* (2006.01)
*G06F 13/14* (2006.01)

(52) U.S. Cl.
USPC ............................ 345/503; 345/502; 345/519

(58) Field of Classification Search
USPC ............................ 345/502–504, 505–506, 519
See application file for complete search history.

(56) References Cited

U.S. PATENT DOCUMENTS

| | | | |
|---|---|---|---|
| 4,967,375 A | | 10/1990 | Pelham et al. |
| 5,530,798 A | * | 6/1996 | Chu et al. ...................... 345/502 |
| 5,995,121 A | * | 11/1999 | Alcorn et al. .................. 345/520 |
| 6,359,624 B1 | * | 3/2002 | Kunimatsu .................... 345/503 |
| 6,473,086 B1 | * | 10/2002 | Morein et al. ................ 345/505 |
| 6,633,296 B1 | * | 10/2003 | Laksono et al. .............. 345/502 |
| 6,707,457 B1 | * | 3/2004 | Bates ............................. 345/503 |
| 6,864,896 B2 | * | 3/2005 | Perego ........................... 345/542 |
| 6,900,813 B1 | * | 5/2005 | Stefanidis ..................... 345/562 |
| 6,919,897 B1 | * | 7/2005 | Ford et al. ..................... 345/506 |
| 6,985,152 B2 | * | 1/2006 | Rubinstein et al. .......... 345/520 |
| 7,075,541 B2 | * | 7/2006 | Diard ............................. 345/505 |
| 7,355,601 B2 | * | 4/2008 | Andrews et al. ............. 345/505 |
| RE40,326 E | * | 5/2008 | Fielder et al. ................ 345/519 |

(Continued)

FOREIGN PATENT DOCUMENTS

| | | |
|---|---|---|
| CN | 2638364 | 9/2004 |
| GB | 2281682 | 3/1995 |

OTHER PUBLICATIONS

Nakatsuka et al., A One Chip Super Graphics CPU with Direct Unified Memory Controller Suitable for Car Information and Control System, 2001, IEEE 2001 Custom Integrated Circuits Conference, 421-422.*

(Continued)

*Primary Examiner* — Joni Richer
(74) *Attorney, Agent, or Firm* — Katten Muchin Rosenman LLP

(57) ABSTRACT

A first GPU is provided with a digital video output terminal (Vout terminal) for connection to an external source. A digital video signal output from the Vout terminal is provided to a display device via a HDMI. The first GPU and a second GPU are connected to each other via a data bus for bidirectional data exchange. The second GPU applies a predetermined rendering process on data provided from the first GPU via a data input and output interface. The rendered data is returned to the first GPU via the data input and output interface. The first GPU processes the data returned from the second GPU as necessary and outputs a digital video signal via the Vout terminal and the HDMI.

16 Claims, 3 Drawing Sheets

(56) References Cited

U.S. PATENT DOCUMENTS

| | | | |
|---|---|---|---|
| 2001/0035866 A1* | 11/2001 | Finger et al. | 345/568 |
| 2003/0164833 A1* | 9/2003 | Walls et al. | 345/506 |
| 2004/0046761 A1* | 3/2004 | Hellman et al. | 345/502 |
| 2005/0104876 A1* | 5/2005 | Yanagisawa et al. | 345/204 |
| 2005/0275642 A1* | 12/2005 | Aufranc et al. | 345/204 |
| 2006/0146076 A1* | 7/2006 | Huang et al. | 345/699 |
| 2007/0200960 A1* | 8/2007 | Bennett et al. | 348/723 |
| 2008/0266300 A1* | 10/2008 | Deering et al. | 345/502 |

OTHER PUBLICATIONS

First Office Action dated Apr. 18, 2008, from the corresponding Chinese Application.

European Search Report dated May 17, 2010 for corresponding European Patent Application No. 06253609.

Elmar Maas, et al., "A Processor-Coprocessor Architecture for High End Video Applications", Proceedings of the 1997 IEEE International Conference on Acoustics, Speech, and Signal Processing, 1997, pp. 595-598, vol. 1, IEEE.

* cited by examiner

MULTI-GRAPHICS PROCESSOR SYSTEM, GRAPHICS PROCESSOR AND RENDERING METHOD

BACKGROUND OF THE INVENTION

1. Field of the Invention

The present invention relates to a multi-graphics processor system, a graphics processor and a rendering method for processing rendering data.

2. Description of the Related Art

High-quality graphics are extensively used now as personal computers and gaming devices are used to run applications like games and simulations that use high-quality three-dimensional graphics and to play back image content in which actual footage and computer graphics are blended.

Since the performance of a graphics chip installed in a personal computer or a gaming device affects rendering quality, manufacturers are putting efforts to develop new-generation graphics chips offering increasingly advanced performance. Thus, competition to develop graphics chips is intensifying. It should also be noted that advanced graphics are achieved not only through hardware technology but combination of hardware technology and software technology. Effective use of high-performance rendering functions of a graphics chip by taking full advantage software technology is important in enhancing the quality of rendering.

As competition to develop graphics chips is intensifying, graphics chips incorporating advanced rendering functions are developed one after another, promising future progress and expandability of graphic systems. Meanwhile, development of graphics chips also requires flexibility to secure compatibility with older-generation programming languages and adaptability to various video output formats and protocols, while assuring progress in graphic systems.

SUMMARY OF THE INVENTION

A general purpose of the present invention is to provide a multi-graphics processor system flexible enough to adapt to various environments.

A multi-graphics processor system according to at least one embodiment of the present invention comprises a first graphics processor and a second graphics processor. Data provided from the first graphics processor to the second graphics processor is processed by the second graphics processor, returned to the first graphics processor and output as a video signal from a video output terminal provided in the first graphics processor.

According to this embodiment, a video signal is output through a single channel in a system having two graphics processors with the result that the system configuration is simplified.

The first graphics processor may be provided with a digital video output interface which protects the security of video signals, and the video signal output from the video output terminal may be output to an external device via the digital video output interface.

With this, the security of the output signal is maintained in the output channel for the video signal.

The second graphics processor may be a memory-integrated processor chip in which a processor core and a video memory are integrated in a single chip. With this, the second graphics processor is capable of high-speed memory access. Thus, a process requiring frequent memory access for reading and writing can be performed at a high speed so that the result of the process can be supplied to the first graphics processor.

The first graphics processor may be a processor chip connected to an external memory via a bus, and the data returned from the second graphics processor to the first graphics processor may be stored in the memory. The data returned from the second graphics processor to the first graphics processor may be image data comprised of pixel data, an analog video signal or a digital video signal. With this, rendering data returned from the second graphics processor can be stored in a video memory, whereupon the first graphics processor performs a rendering process on the rendering data stored in the video memory as required.

The first graphics processor may process the data returned from the second graphics processor to the first graphics processor before outputting the processed data from the video output terminal. Processes applied by the first graphics processor to the data returned from the second graphics processor include changing of the resolution of image data, changing of a frame rate and conversion of a video signal format. Conversion of a format refers to a process for converting between various formats of video signal. Examples of conversion include a process for converting between video formats to overcome country-specific or region-specific difference in video signal formats such as NTSC, PAL and SECAM and a process for converting between the SD format, which is a standard format for broadcast, and the HD format, which is a video format for high-definition broadcast such as High-Vision.

A first mode and a second mode may be selectable, the first mode being such that data is provided from the first graphics processor to the second graphics processor for processing by the second graphics processor, returned to the first graphics processor and output from the video output terminal, the second mode being such that data is directly output from the video output terminal of the first graphics processor without being processed by the second graphics processor.

A graphics processor according to at least one embodiment comprises: an input and output interface for bidirectional exchange of data with another graphics processor; and a video output terminal which outputs a video signal to an external device. Data is provided to the another graphics processor via the input and output interface, and data processed by the another graphics processor is acquired via the input and output interface and output from the video output terminal.

A rendering method in a multi-graphics processor system including a first graphics processor and a second graphics processor, according to at least one embodiment of the present invention, is configured such that data provided from the first graphics processor to the second graphics processor is processed by the second graphics processor, returned to the first graphics processor and output from a video output terminal provided in the first graphics processor.

Optional combinations of the aforementioned constituting elements and implementations of the invention in the form of methods, processors, apparatuses, systems, computer programs, data structures etc. may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

First Embodiment

Figure 1:
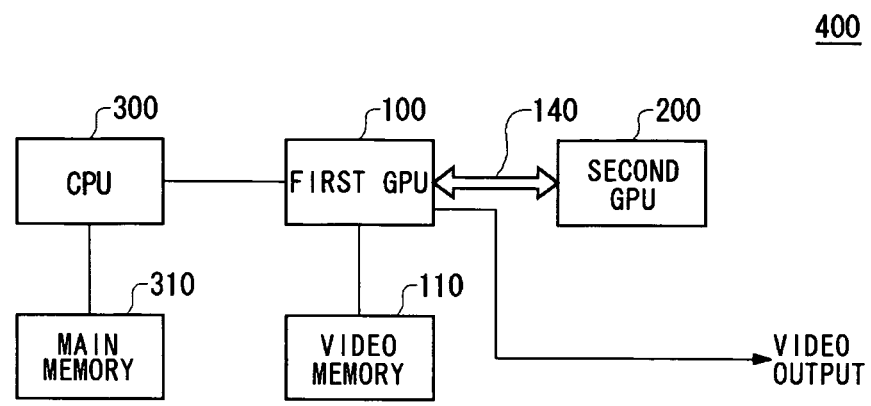
FIG. 1 shows the structure of a multi-graphics processor system according to an embodiment of the present invention.

FIG. 1 shows the structure of a multi-graphics processor system 400 according to a first embodiment of the present invention.

A multi-graphics processor system 400 includes a first graphics processing unit (GPU) 100, a second GPU 200, a video memory 110, a central processing unit (CPU) 300 and a main memory 310.

The first GPU 100 and the second GPU 200 are graphics chips provided with respective graphics processor cores. The first GPU and the second GPU may be of the same type or may be graphics chips of different types provided with different processing functions.

The first GPU 100 is capable of reading and writing rendering data from and to the video memory 110 connected to the first GPU 100. The first GPU 100 and the second GPU 200 are connected to each other via a data bus 140. The data bus may be a bilateral bus for sending and receiving data. Alternatively, the data bus may be formed as a two unidirectional buses so that a forward channel and a backward channel are isolated from each other. A data input/output interface is provided in both the first GPU 100 and the second GPU 200 so that the first GPU 100 and the second GPU 200 can perform bidirectional data exchange.

Data processed by the first GPU 100 is delivered to the second GPU 200 via the data bus 140 and subject to a rendering process in the second GPU 200. The result of the rendering process by the second GPU 200 is returned to the first GPU 100 via the data bus 140 for further rendering by the first GPU 100 as necessary.

The CPU 300 loads and executes a program stored in the memory 310 so as to read and write data from and to the main memory 310. The CPU 300 also exercises overall control of the multi-graphics processor system 400.

The first GPU 100 is connected to the CPU 300 via an interface for connection to an external device. The first GPU 100 and the CPU 300 can exchange data via this interface.

The first GPU 100 and the CPU 300 may perform respective processes in parallel. Alternatively, the processes in the first GPU 100 and the CPU 300 may proceed sequentially. Data processed by the first GPU 100 may be delivered to the CPU 300 for further processing by the CPU 300. Alternatively, data processed by the CPU 300 may be delivered to the first GPU 100 for further processing by the first GPU 100.

The first GPU 100 is provided with a terminal for outputting a video signal to an external device. The output video signal is provided to a display device to display three-dimensional graphics. The second GPU 200 is not provided with a terminal for directly outputting a video signal to an external device.

The first GPU 100 and the second GPU 200 may be mounted on a board like a single graphics board. Alternatively, the first GPU 100 and the second GPU 200 may be mounted on separate boards so that the two boards are connected to each other via a connector. Alternatively, at least one of the first GPU 100 and the second GPU 200 may be mounted on a board such as a motherboard on which the CPU 300 is mounted.

While the CPU 300 is described herein as being a single main processor, it may be a multiprocessor system including multiple processors or a multi-core processor in which multiple processor cores are integrated in a single package.

Figure 2:
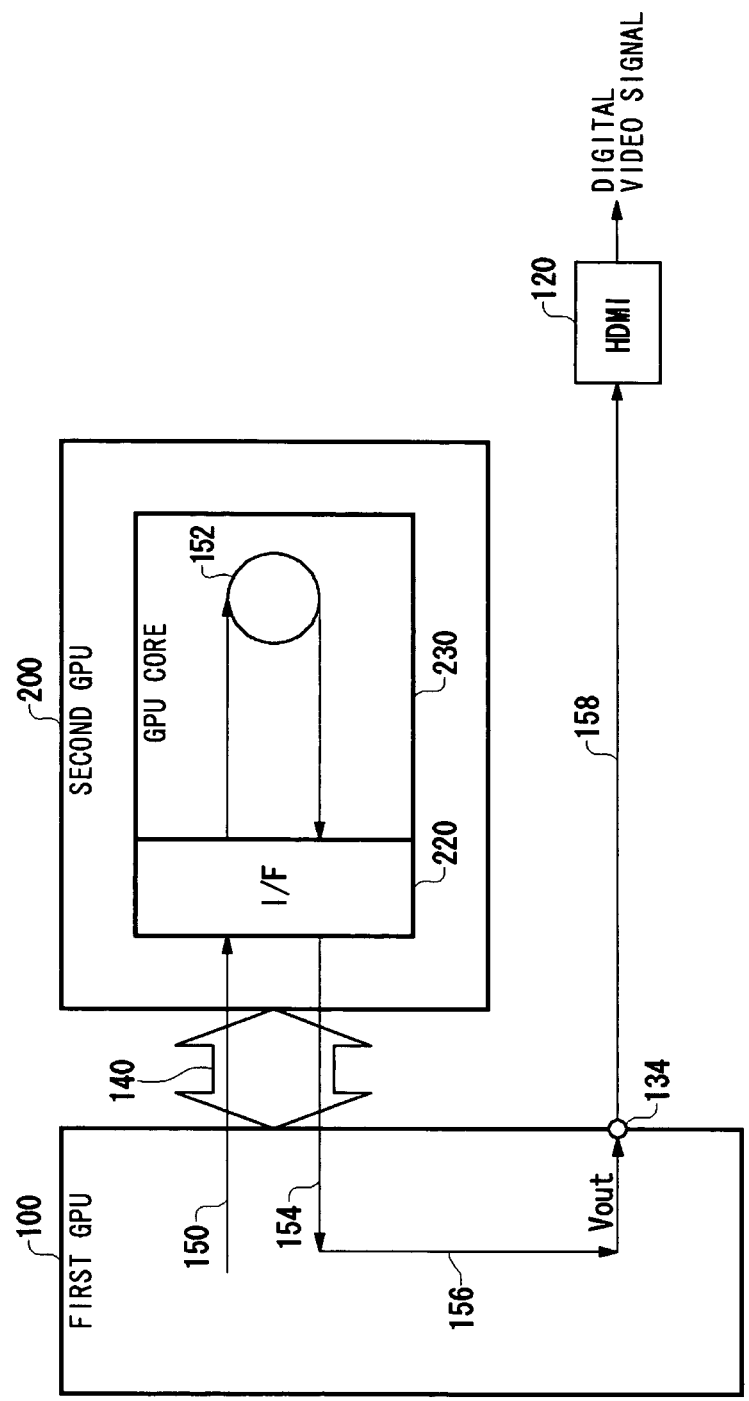
FIG. 2 shows the flow of a video signal in a first GPU and a second GPU.

FIG. 2 is a diagram showing the flow of data in the first GPU 100 and the second GPU 200.

The first GPU 100 is provided with a digital video output terminal 134 (referred to as "Vout terminal") for providing a digital video output to an external device. The digital video signal output from the Vout terminal is provided to a display device via a High-Definition Multimedia Interface (HDMI) 120 (reference numeral 158). HDMI is an interface for transmitting a digital video signal and a digital audio signal. HDMI is provided with a copyright protection function called High-Bandwidth Digital Content Protection (HDCP) which enables secure transmission of digital content.

The first GPU 100 and the second GPU 200 are connected to each other via the data bus 140 for bidirectional data exchange. Exchanged between the first GPU 100 and the second GPU 200 is, for example, rendering data comprised of pixel data such as RGB values and alpha values for rendering an image.

The second GPU 200 has a built-in data input and output interface 220 for exchanging data with the first GPU 100 and also has a built-in GPU core 230 for processing data acquired via the data input and output interface 220. The data input and output interface 220 is provided with a buffer for buffering input and output data.

Data processed by the first GPU 100 is delivered to the input and output interface 220 of the second GPU 200 via the data bus 140 (reference numeral 150).

The GPU core 230 subjects the data provided from the first GPU 100 via the input and output interface 220 to a predetermined rendering process (reference numeral 152) and returns the rendered data to the first GPU 100 via the data input and output interface 220 (reference numeral 154). The first GPU 100 processes the data returned from the second GPU 200 as required (reference numeral 156) and outputs a digital video signal to an external device via the Vout terminal and the HDMI 120 (reference numeral 158).

In addition to a data transmission channel for providing a video signal output from the Vout terminal to an external device via the HDMI 120 without subjecting the signal to a process in the second GPU 200, the first GPU 100 can also use a data transmission channel in which data is provided to the second GPU 200 for processing in the second GPU 200, whereupon the processed data is returned to the first GPU 100 and output via the Vout terminal and the HDMI 120 (reference numerals 150-158). These two data transmission channels may be selected or switched into use by a mode established by a rendering program or the CPU 300.

Since the second GPU 200 is not provided with an interface for outputting a video signal to an external display device, data processed by the second GPU 200 is returned to the first GPU 100 for further processing in the first GPU 100 as necessary, whereupon a video signal is output to an external display device via the HDMI 120 of the first GPU 100.

For example, the first GPU 100 may change the resolution of motion pictures provided by the second GPU 200 or change the frame rate thereof.

The rendering data processed by the first GPU 100 results in a digital video signal output from the Vout terminal. Security of the digital video signal is ensured by outputting it via the HDMI 120.

By configuring signal transmission channels so that video outputs are provided exclusively via the first GPU 100 instead of providing a video output terminal in the second GPU 200 for connection to an external device, the following advantages are gained.

(1) Providing a video output terminal in the second GPU 200 for connection to an external device would require a selector for switching between different channels for video output, resulting in redundant system configuration and increased fabrication cost. In the multi-graphics processor system 400 of this embodiment, the HDMI 120 is the sole interface for outputting a digital video signal from the graphics processors. This results in simplified system configuration, miniaturization and reduction in fabrication cost.

(2) Since the transmission channels are configured to ensure that rendering data processed by the second GPU 200, as well as data from the first GPU 100, is output via the HDMI 120 of the first GPU 100, the HDCP function provided in the HDMI 120 guarantees the security of video signals output to an external device from the multi-graphics processor system 400.

(3) By importing data processed by the second GPU 200 in the first GPU 100, the GPU 100 can perform various processes such as changing the resolution or frame rate of motion pictures and antialiasing. This can ensure that rendering data with consistent quality is output from the multi-graphics processor system 400 provided with multiple heterogeneous graphics processors.

There are some variations to the structure of the multi-graphics processor system 400 described above. A description will now be given of those variations.

Second Embodiment

Figure 3:
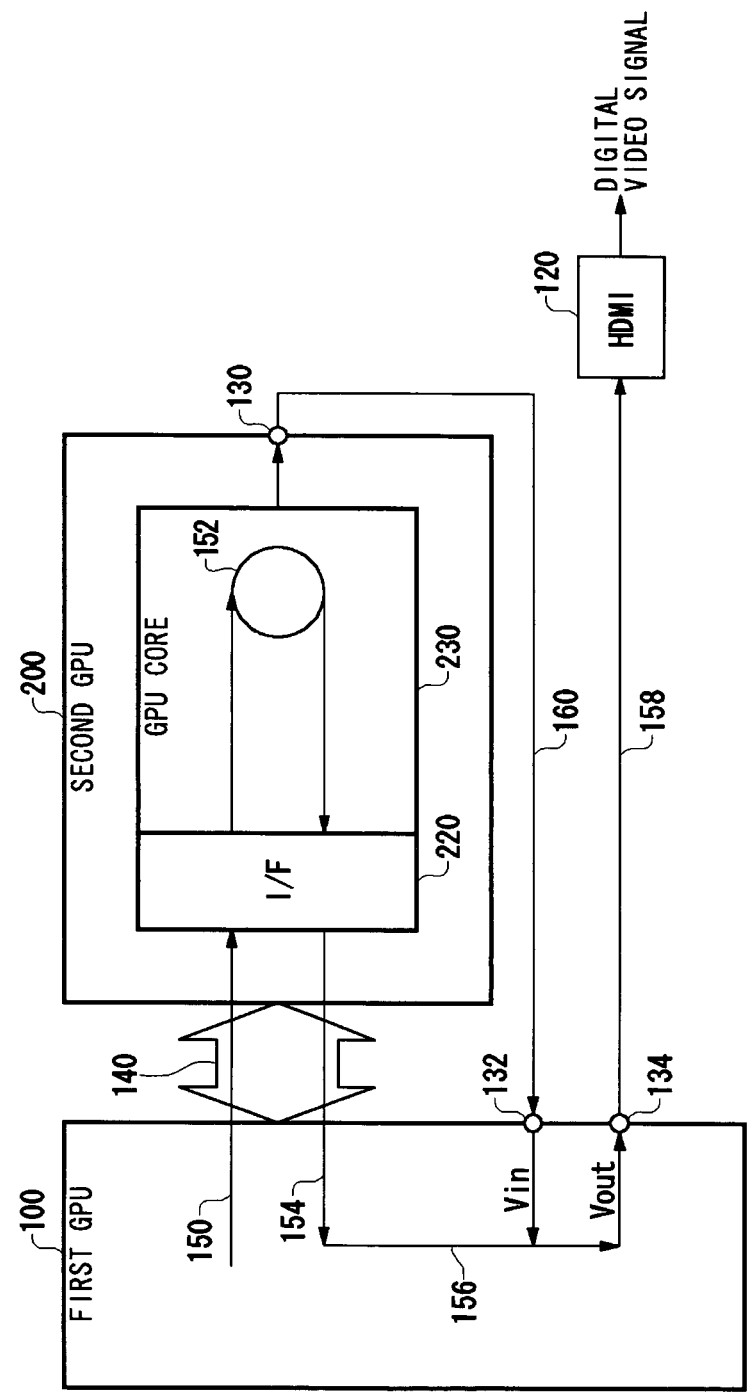
FIG. 3 shows the flow of a video signal in the first GPU and the second GPU of FIG. 1 according to another embodiment of the present invention.

In the first embodiment, the second GPU 200 is not provided with a video output terminal for connection to an external device. In the second embodiment, the second GPU 200 is provided with a video output terminal 130 and the first GPU 100 is provided with a video input terminal 132, as shown in FIG. 3. The other aspects of the structure remain unchanged from that of the first embodiment. Like components are denoted by like numerals and the description thereof is omitted.

The rendering data processed by the GPU core 230 of the second GPU 200 results in a video signal output from the video output terminal 130 and input to the video input terminal 132 (referred to as "Vin terminal") of the first GPU 100 (reference numeral 160).

The video signal provided from the second GPU 200 to the Vin terminal of the first GPU 100 is processed by the first GPU 100. Given, for example, that the second GPU 200 is a graphics chip outputting Standard Definition (SD) video and the first GPU 100 is a graphic chip outputting High Definition (HD) video, the first GPU 100 converts an SD signal provided from the second GPU 200 into an HD signal. If the second GPU 200 is a graphics chip outputting an analog video signal and the first GPU 100 is a graphics chip outputting a digital video signal, the first GPU 100 converts the analog video signal provided from the second GPU 200 into a digital video signal.

The video signal processed for conversion by the first GPU 100 is output from the Vout terminal and output to an external device as a digital video signal via the HDMI 120.

The Vin terminal of the first GPU 100 may also be used to receive data from the second GPU 200. In this case, the data bus between the first GPU 100 and the second GPU 200 may be a unidirectional bus for delivering data from the first GPU 100 to the second GPU 200 unidirectionally, instead of a bidirectional bus.

By configuring the signal transmission channels so that a video signal output from the second GPU 200 is input to the Vin terminal of the first GPU 100 and output from the Vout terminal of the first GPU 100, the following advantages are gained.

(1) Since a video signal output from the second GPU 200 is input to the Vin terminal of the first GPU 100, bypassing the data bus 140, the bandwidth of the data bus 140 is not consumed. While a video signal is provided from the second GPU 200 to the first GPU 100, bidirectional data exchange via the bidirectional data bus 140 can proceed in parallel between the first GPU 100 and the second GPU 200.

(2) If the Vin terminal of the first GPU 100 is used both to receive a video signal output from the video output terminal 130 of the second GPU 200 and to receive data output from the data input and output interface 220 of the second GPU 200, the data bus 140 between the first GPU 100 and the second GPU 200 may be configured as a unidirectional bus for delivering data from the first GPU 100 to the second GPU 200 unidirectionally so that the circuit scale is reduced and the system can be fabricated at a reduced cost.

(3) Since the video signal transmission channels are configured such that a video signal output from the second GPU 200 is output via the HDMI 120 of the first GPU 100, the HDCP function provided in the HDMI 120 guarantees the security of video signals output to an external device from the multi-graphics processor system 400.

(4) If the video signal formats and security schemes employed to protect video signals differ from region to region or country to country, providing graphics chips in adaptation to region-specific or country-specific video formats and security schemes incurs a high cost. In this case, if the HDMI 120 of the first GPU 100 is provided with a video output interface adapted to the video format or the security scheme of the country in which the system is in use, the HDMI 120 of the first GPU 100 can output a video signal adapted to the format of the country in which the system is in use even if the second GPU 200 is not provided with a video output interface adapted to the country. This is achieved by delivering a video output from the second GPU 200 to the first GPU 100. With the inventive two-chip configuration, it is possible to overcome difference in specification between the graphics chips such as a difference in video signal formats.

(5) By importing data output from the second GPU 200 to the first GPU 100, the GPU 100 can perform various processes such as conversion from SD video into HD video and conversion from analog video into digital video. In the presence of difference in quality or format of video signals generated by the first GPU 100 and the second GPU 200, the video signal can be adjusted in the first GPU 100 for quality and format, before being output from the system. This can ensure that video signals with consistent quality and format are output from the multi-graphics processor system 400 provided with multiple heterogeneous graphics processors.

Third Embodiment

In the multi-graphics processor system 400 according to this embodiment, the processing performance and functions of the first GPU 100 and the second GPU 200 differ, and the first GPU 100 and the second GPU 200 share the task of processing.

The second GPU 200 is, for example, an embedded DRAM graphics chip. An embedded DRAM chip is configured such that a DRAM and a logic circuit are integrated in a single semiconductor chip. While there are constraints to the capacity of a DRAM that can be installed in the chip, a large memory bandwidth not available in discrete chips is available for use. This enables the second GPU 200 to read from and write to a video memory at a high speed by using the DRAM installed in the chip as a video memory. As such, the second GPU 200 is suitable for a rendering process requiring frequent reading and writing in a video memory for texture overlay as an example.

In contrast, the first GPU 100 is connected to the large-capacity video memory 110 and so can use a memory with a relatively small bandwidth but a satisfactorily large capacity. As such, the first GPU 100 is suitable for processes consuming large amounts of memory. Moreover, the first GPU 100 is suitable for a rendering process such as that performed by a shader program which requires computing power more than memory access.

The aforementioned difference in memory configuration between the first GPU 100 and the second GPU 200 can be taken advantage of to allow the first GPU 100 and the second GPU 200 to share the task of rendering in various manners. For example, the first GPU 100 may be assigned the task of performing pixel shading which includes complex computation of light reflection, shading processes etc. and which requires a large computing volume. The second GPU 200 may be assigned the task of performing rendering processes such as a rasterization process, a texture mapping process, motion blur and alpha blending, which require frequent access to the memory for reading and writing.

In order to cause the second GPU 200 to perform a process requiring a relatively large memory bandwidth, an intermediate result of processing may be delivered from the first GPU 100 to the second GPU 200 so that the second GPU 200 performs a memory-intensive process. Only the result from this process may be returned to the first GPU 100. The bandwidth of the interface between the first GPU 100 and the second GPU 200 may be narrow.

Further, the first GPU 100 and the second GPU 200 may be provided with different graphics processing functions. For example, the processing functions installed in the two graphics chips may differ such that one of the graphics chips includes a geometry processor and the other includes a pixel processor. Alternatively, one of the graphics chips may include a unit dedicated to texture mapping. Alternatively, the two graphics chips may be provided with the same graphics processing function and may differ only in rendering performance.

The first GPU 100 may be used as a master GPU and the second GPU 200 may be used as a slave GPU so that master slave task sharing may be practiced in which the master GPU is responsible for a main rendering process and the slave GPU is responsible for an auxiliary rendering process.

By allowing the first GPU 100 and the second GPU 200, which differ in processing function and memory bandwidth, to perform respective processes to which they are suited to, the overall rendering process can be efficiently performed.

In this way, even in the presence of process bottleneck in one of the graphics processor, the other graphics processor can continue its process in parallel. By providing the specification of the two graphics processors to a programmer, a programming solution is achieved which is designed for efficient rendering by appropriately using the different graphics processors in the multi-graphics processor system 400 of a dual-chip configuration.

Fourth Embodiment

In the multi-graphics processor system 400 of this embodiment, the first GPU 100 functions as a bridge between the CPU 300 and the second GPU 200 for converting between signal protocols and formats. The second GPU 200 is capable of exchanging data with the CPU 300 via the first GPU 100 as a bridge. This configuration is particularly useful if the first GPU 100 is a graphics chip provided with an interface with the CPU 300, but the second GPU 200 is a graphics chip not provided with an interface with the CPU 300.

With this configuration, rendering data from the second GPU 200 delivered to the CPU 300 for processing may be returned from the CPU 300 to the first GPU 100 so that the first GPU 100 can output the rendering data. It will be appreciated that, by providing the first GPU 100 with a secure video output interface such as the HDMI 120, the first GPU 100 functions as a bridge with a built-in security function. By modifying the video output interface provided in the first GPU 100, the first GPU 100 can adapt to a variety of security schemes and can easily deal with future changes in the specification.

Fifth Embodiment

In the multi-graphics processor system 400 of this embodiment, the first GPU 100 is a chip that succeeds the second GPU 200. In this case, if a system in which only the first GPU 100 is installed is provided, applications like games that can be run only on the second GPU 200 fail to be run due to incompatibility. This is addressed by providing the multi-graphics processor system 400 in which both the new-generation first GPU 100 and the older-generation second GPU 200 are installed.

In this way, compatibility of applications is maintained by running an older-generation application on the second GPU 200 and delivering a video signal from the second GPU 200 to the first GPU 100 for output from the first GPU 100. When an older-generation application is no longer used and there is no need to maintain compatibility, the second GPU 200 may be removed from the system so that the system continues to be operated only with the first GPU 100. By maintaining compatibility with a dual-graphic chip configuration and removing the older-generation graphics chip as necessary, flexible product line-up adapted to the time to deliver products or user's needs can be achieved.

Given above is an explanation of the invention based upon the embodiments. The embodiments described are only illustrative in nature and various variations in constituting elements and processes involved are possible. Those skilled in the art would readily appreciate that such variations are also within the scope of the present invention. Some examples of such variations will be described below.

The multi-graphics processor system 400 provided with two graphics processors and one control processor has been described in the embodiments. Alternatively, the control processor may not be included and only the two graphics processors may be included.

The dual graphics processor system provided with two graphics processor has been described in the embodiments. Alternatively, the system may include three or more graphics processors. In this case, three or more graphics processors may form a pipeline for sequential execution of a rendering process. The graphics processor in the last stage in the pipeline may return a processed video signal to the first graphics processor so that the first graphics processor outputs the video signal. By providing video outputs via only one interface in this way, redundancy in system configuration is eliminated. Further, by increasing the number of graphics processors, efficient rendering is achieved.

What is claimed is:

1. A multi-graphics processor system comprising a first graphics processor and a second graphics processor, wherein image data that is processed by the first graphics processor and provided from the first graphics processor to the second graphics processor is processed by the second graphics processor, returned to the first graphics processor and output as a video signal from a video output terminal provided in the first graphics processor as the sole output interface,
wherein, before the image data is output as a video signal from the video output terminal, the first graphics processor checks the consistency of the image data and performs processing on the image data for consistent quality of image data from the second graphics processor, and
wherein the second graphics processor is a processor with a merged memory processor chip in which a processor core and an individual video memory are integrated in a single chip, while the first graphics processor is a processor chip connected to an external memory via a bus, and the image data returned from the second graphics processor to the first graphics processor is stored in the external memory.

2. The multi-graphics processor system according to claim 1, wherein the first graphics processor is provided with a digital video output interface which protects the security of video signals, and the video signal output from the video output terminal is output to an external device via the digital video output interface.

3. The multi-graphics processor system according to claim 1, wherein the first graphics processor processes the image data returned from the second graphics processor to the first graphics processor before outputting the processed image data from the video output terminal.

4. The multi-graphics processor system according to claim 3, wherein the image data returned from the second graphics processor to the first graphics processor is in the form of pixel data, and the first graphics processor changes the resolution of the pixel data returned from the second graphics processor.

5. The multi-graphics processor system according to claim 3, wherein the image data returned from the second graphics processor to the first graphics processor is in the form of pixel data, and the first graphics processor changes the frame rate of the pixel data returned from the second graphics processor.

6. The multi-graphics processor system according to claim 3, wherein the image data returned from the second graphics processor to the first graphics processor is in the form of a video signal, and the first graphics processor converts the format of video signal returned from the second graphics processor.

7. The multi-graphics processor system according to claim 1, wherein a first mode and a second mode are selectable, the first mode being such that image data is provided from the first graphics processor to the second graphics processor for processing by the second graphics processor, returned to the first graphics processor, and output from the video output terminal, and the second mode being such that image data is directly output from the video output terminal of the first graphics processor without being processed by the second graphics processor.

8. The multi-graphics processor system according to claim 1, wherein the image data returned from the second graphics processor to the first graphics processor is received via a unidirectional bus.

9. A first graphics processor comprising:
an input and output interface for bidirectional exchange of image data with a second graphics processor; and
a video output terminal, which outputs a video signal to an external device, wherein
image data that is processed by the first graphics processor is provided to the second graphics processor via the input and output interface, and
image data processed by the second graphics processor is returned via the input and output interface and output from the video output terminal, and wherein
before the image data is output as a video signal from the video output terminal, the first graphics processor checks the consistency of the image data and performs processing on the image data for consistent quality of image data from the second graphics processor, and
the second graphics processor is a processor with a merged memory processor chip in which a processor core and an individual video memory are integrated in a single chip, while the first graphics processor is a processor chip connected to an external memory via a bus, and the image data returned from the second graphics processor to the first graphics processor is stored in the external memory.

10. The first graphics processor according to claim 9, further comprising a digital video output interface which protects the security of video signals, and the video signal output from the video output terminal is output to an external device via the digital video output interface.

11. The first graphics processor according to claim 9, wherein the first graphics processor processes the image data returned from the second graphics processor via the input and output interface before outputting the processed image data from the video output terminal.

12. The first graphics processor according to claim 11, wherein the image data returned from the second graphics processor via the input and output interface is in the form of pixel data, and the first graphics processor changes the resolution of the pixel data returned from the second graphics processor.

13. The first graphics processor according to claim 11, wherein the image data returned from the second graphics processor via the input and output terminal is in the form of pixel data, and the first graphics processor changes the frame rate of the pixel data returned from the second graphics processor.

14. The first graphics processor according to claim 11, wherein the image data returned from the second graphics processor via the input and output interface is in the form of a video signal, and the first graphics processor converts the format of video signal returned from the second graphics processor.

15. The first graphics processor according to claim 9, wherein a first mode and a second mode are selectable, the first mode being such that image data is provided to the second graphics processor for processing by the second graphics processor, whereupon the processed image data is returned via the input and output interface and then output from the video output terminal, the second mode being such that the image data is directly output from the video output terminal without being processed by the second graphics processor.

16. A rendering method in a multi-graphics processor system including a first graphics processor and a second graphics processor, wherein image data that is processed by the first graphics processor and provided from the first graphics processor to the second graphics processor is processed by the second graphics processor, returned to the first graphics processor and output from a video output terminal provided in the first graphics processor as the sole output interface,
wherein, before the image data is output as a video signal from the video output terminal, the first graphics processor checks the consistency of the image data and performs processing on the image data for consistent quality of image data from the second graphics processor, and wherein the second graphics processor is a self-contained processor as a merged memory processor chip in which a processor core and an individual video memory are integrated in a single chip, while the first graphics processor is a processor chip connected to an external memory via a bus, and the image data returned from the second graphics processor to the first graphics processor is stored in the external memory.

* * * * *